United States Patent [19]

Eager

[11] 3,884,117

[45] May 20, 1975

[54] DRILLING AND TAPPING SCREW FORMATION

[75] Inventor: William A. Eager, Cornwall, N.Y.

[73] Assignee: Star Expansion Industries Corporation, Mountainville, N.Y.

[22] Filed: Aug. 15, 1973

[21] Appl. No.: 388,596

Related U.S. Application Data

[63] Continuation-in-part of Ser. No. 132,119, April 7, 1971, abandoned.

[52] U.S. Cl.................. 85/47; 10/10 R; 408/226
[51] Int. Cl.² ...................................... F16B 25/00
[58] Field of Search............... 85/47, 41, 48, 1 P; 10/10 R, 152 T, 152 R; 408/226, 230, 229, 228, 227

[56] References Cited
UNITED STATES PATENTS

| 3,125,923 | 3/1964 | Hanneman | 85/47 |
| 3,241,426 | 3/1966 | Gutshall | 85/47 |
| 3,344,817 | 10/1967 | Connard | 85/47 X |
| 3,358,548 | 12/1967 | Dyslin | 85/47 |
| 3,395,603 | 8/1968 | Skierski | 85/47 |
| 3,463,045 | 8/1969 | Prescott | 85/41 |
| 3,500,713 | 3/1970 | Bell | 85/41 |
| 3,564,948 | 2/1971 | Pomernacki | 408/226 X |

Primary Examiner—Ramon S. Britts
Attorney, Agent, or Firm—Friedman & Goodman

[57] ABSTRACT

A drilling and tapping screw of the type having an intermediate threaded shank, a head at one end thereof and a pilot cutting or drilling end at the other end thereof, has a plurality of helical flutes extending about the periphery of the pilot end with leading cutting edge portions extending into respective flutes at the leading edges of the cutting surfaces. The cutting edge portions of the present invention have dimensions substantially smaller than those defining the flutes. The rake angle defined by the cutting edge portion relative to the axis of the shank at least equals approximately 45°. Each cutting edge portion projects into an associated flute, in a direction normal to an associated cutting surface, a distance approximately in the range between 0.001 to 0.003 inches. The screw is made from a ductile metal, only the exterior surface thereof being carburized.

10 Claims, 16 Drawing Figures

PATENTED MAY 20 1975  3,884,117

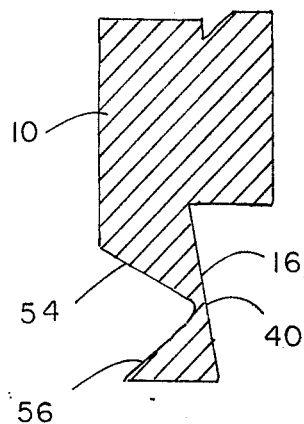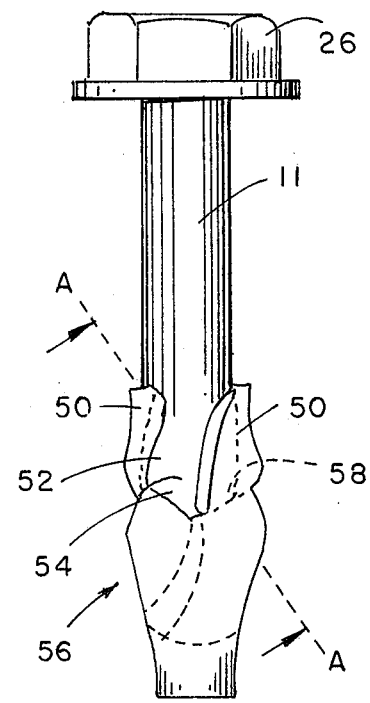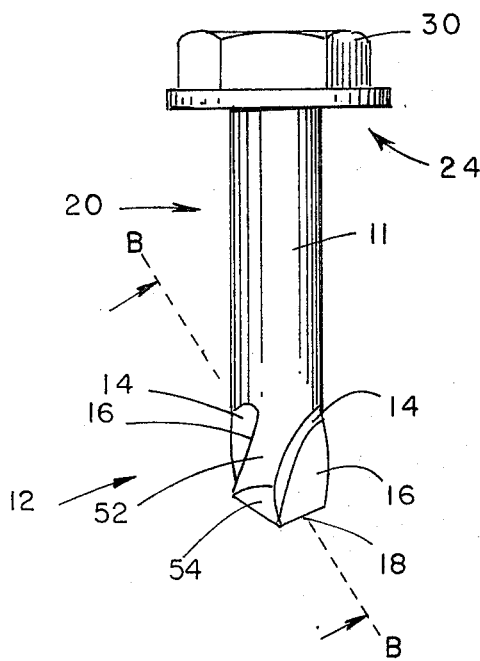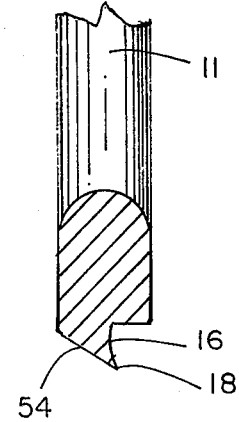

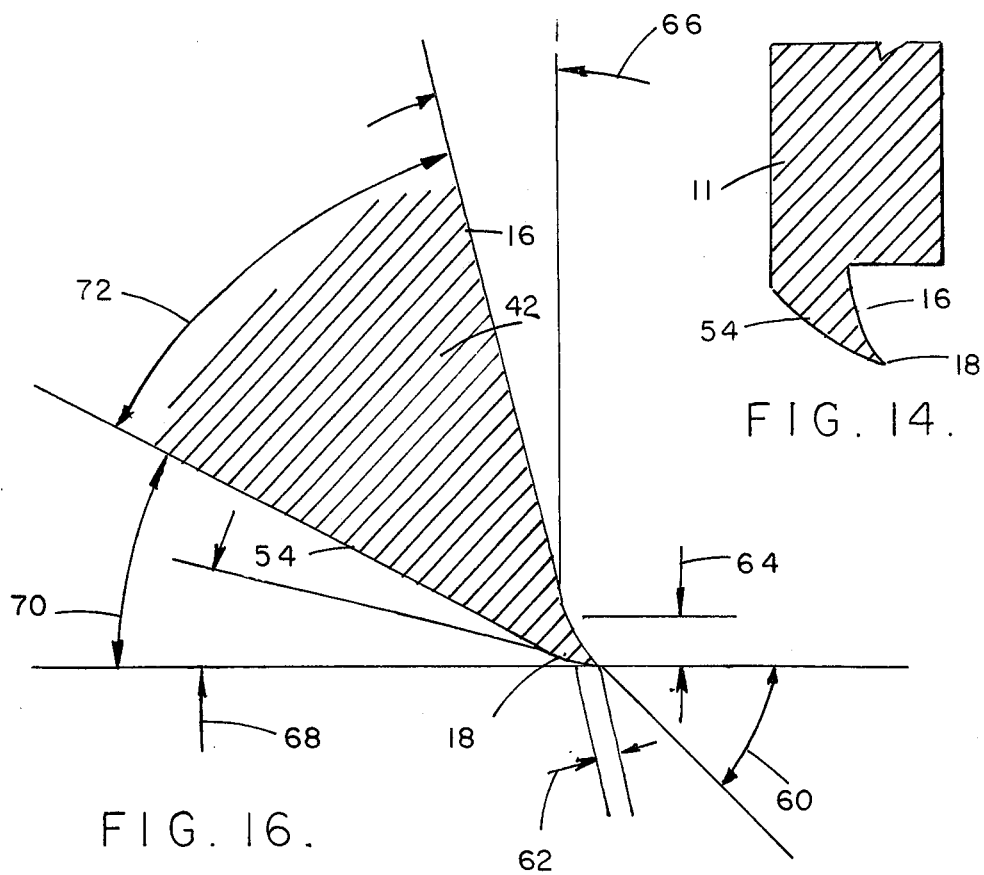
FIG. 14.
FIG. 16.
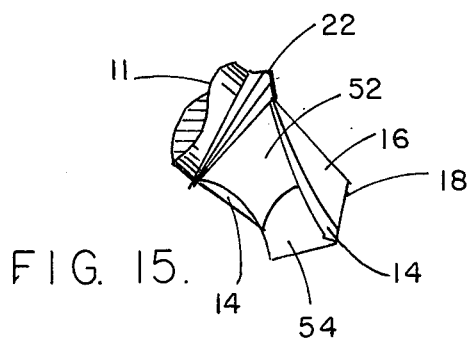
FIG. 15.

DRILLING AND TAPPING SCREW FORMATION

CROSS REFERENCES TO RELATED APPLICATION

The present application is a continuation-in-part application of application Ser. No. 132,119, filed Apr. 7, 1971, now abandoned.

BACKGROUND OF THE INVENTION

The present invention generally relates to fasteners, and more particularly to a drilling and tapping screw formation which is provided with a drilling pilot end portion provided with helical flutes and cutting edge portions projecting into respective flutes having dimensions substantially smaller than those of the latter and defining relatively large rake angles.

Articles having combined screwing and drilling extents are conventional. Generally, the purpose of the drilling extremity is to permit an opening or bore to be formed in the material so that the threaded extent may be readily engaged therein with minimal difficulty and time expended. The drilling extremity is generally constituted of flutes each defined by a cutting surface and a relief surface. The cutting surface is provided with cutting edges at the leading edge portions thereof for contacting the material to be drilled. It is, therefore, clear that the cutting edges must be sharp to more effectively cut the material to reduce the drilling time and obviate the necessity for excessive forces applied at the drilling stage, which excessive forces may either deform the drilling article itself or the material against which the drilling article is urged. Since the drilling and tapping screws are generally mass produced in great quantity, it is clearly unfeasible, uneconomical and most inefficient to sharpen each cutting edge of the drilling extremity after it has been formed by cold forming, forging or the like. Thus, unless the manufacturing procedure is such that during the various stages of forming the drilling extremity the cutting edges of the latter are also formed in substantially their final desired configurations, the resultant screw-drill fastener will most likely be ineffective.

It is well known, when forming a drilling and tapping screw that immediately after the forming operation the drilling extremity is left with burs or flash elements that must be removed. It has been determined that if flash or burs are removed by twisting the burs and the shank portion relative to one another in a manner as is conventionally done, i.e., a direction common to that direction for feeding or drilling the finished screw-drill into the material to form an opening therein, the resultant cutting edges of the drilling extremity which directly act upon the material will be inclined away from the direction of the drill rotation and, thus, the cutting edges have a greater cross-section and are less than most effective.

Other drilling and tapping screws of the prior art are provided with ragged cutting edges which are formed inherently with the manufacturing methods hitherto utilized. On the other hand, the screw in accordance with the present invention, described in the specification that follows and in the claims, are formed by the novel method disclosed in my co-pending application Ser. No. 201,223, filed Nov. 22, 1971. When formed by this method, the drilling and tapping screw of the present invention acquires smooth cutting edge portions which always extend into their respective flutes with relatively high rake angles. Also, the cutting edge portions are small relative to the dimensions generally defined by the flutes and the cutting surfaces of the screw.

In the prior art, the cutting edges have frequently been formed by dies and the dimensions of the cutting edges so formed have been relatively large. Also, the drilling and tapping screws of the prior art have not always optimized the orientations of all of the cutting edges. Consequently, cutting edges varied both as to rake angles as well as to general orientations relative to their respective flutes. This lack of uniformity in the dimensions and orientations of the cutting edges has resulted in generally lower drilling speeds as well as less efficient operation.

SUMMARY OF THE INVENTION

It is an object of the present invention to provide a drilling and tapping screw which is not possessed of the above described disadvantages associated with comparable prior art screws.

It is another object of the present invention to provide a drilling and tapping screw of the type under discussion which is simple in construction and economical to manufacture.

It is still another object of the present invention to provide a drilling and tapping screw as above described which is provided with relatively small cutting edge portions which have relatively high rake angles.

It is a further object of the present invention to provide a drilling and tapping screw which provides a drilling speeds higher than available with conventional formed point screws.

It is still a further object of the present invention to provide a drilling and tapping screw which incorporates particularly sharp cutting edges which project into helical flutes extending about a pilot portion of the screw.

It is yet a further object of the present invention to provide a drilling and tapping screw which is made from a ductile material which has been carburized only in the exterior thereof to thereby provide a screw which has the requisite hard cutting surface while having the requisite flexibility to prevent breakage of the same.

It is an additional object of the present invention to provide a drilling and tapping screw which includes cutting edge portions projecting from the leading edges of cutting surfaces of the screw, the cutting edge portions having dimensions substantially smaller than those associated with the screw and each projecting into a respective flute at rake angles at least equal to approximately 45°.

In order to achieve the above objects, as well as others which will become apparent hereafter, a drilling screw in accordance with the present invention comprises an elongate shank including a trailing end portion into one end of shank and a leading end portion at an opposite end of said shank. An intermediate portion of said shank is threaded for rotation in a predetermined direction and for advancement into a material. Said trailing end portion is provided with a manipulating head. Said leading end portion includes cutting surfaces and relief surfaces each associated with another cutting surface. Each cutting surface is angularly advanced about the axis of said shaft with respect to one associated relief surface relative to said predetermined direction of rotation. Each cutting surface and relief surfaces associated with an adjacent cutting surface is angularly advanced about said axis with respect to said predetermined direction of rotation to define a flute. Each cutting surface includes a substantially smooth leading cutting edge portion of generally lateral extent relative to the longitudinal axis of said shank. Each cutting edge portion projects into a respective flute from the lowermost edge of an associated cutting surface. Each cutting portion has dimensions substantially smaller than those defining said flutes and defines a rake angle relative to the axis of said shank at approximately 45°.

According to the presently preferred embodiment, each cutting edge portion projects into an associated flute in a direction normal to an associated cutting surface a distance approximately in the range between 0.001 to 0.003 inches. An optimum range, in this connection, is between 0.0015 to 0.002 inches.

The rake angle at each cutting surface is approximately 13° measured perpendicular to its cutting edge.

The rake angle between each cutting surface and said axis of said shank is equal to approximately 15°. The maximum height of each cutting edge portion along the direction of said axis of said shank is approximately 0.0025 inches.

To accommodate the above described rake angles, suitable relief angles of each cutting portion relative to a direction normal to said axis of said shank is approximately 15°.

Another pertinent dimension relating to the drilling and tapping screw is the angle formed between each cutting surface and associated relief surface which is approximately 49°.

Another important feature of the present invention is that said shank is made from a ductile steel, preferably having a low carbon content. The exterior of the screw is carburized while the interior of the screw is ductile.

Each flute is generally helical in configuration about said axis of said shank. In the presently preferred embodiment, two flutes are provided disposed diametrically on opposite sides of said axis of said shank. Also, the cutting surface and the relief surface defining each flute are generally disposed approximately 90° with respect to one another.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 10 illustrates the blank in accordance with the present invention prior to the removal of the flash or burs therefrom in accordance with the principles of the present invention;

FIG. 11 illustrates a front elevational view of the article of FIG. 10 after the removal of the burs or flash therefrom in accordance;

FIG. 12 illustrates an enlarged cross-sectional view taken along line A—A perpendicular to the cutting edge in FIG. 10;

FIG. 13 illustrates a cross-sectional view of the drill extremity taken along the line B—B perpendicular to the cutting edge in FIG. 11;

FIG. 14 illustrates an enlarged cross-sectional view taken along the line B—B perpendicular to the cutting edge in FIG. 11 and shows more clearly the incline of the cutting edge of the drilling extremity when formed in accordance with the principles of the present invention;

FIG. 15 illustrates respectively a fragmentary view of the drilling extremity of the finished article as viewed from a different transverse vantage point than that observeable in FIG. 11; and FIG. 16 is an enlarged cross-sectional view of the cutting edge shown in FIG. 14, showing some of the important dimensions which characterize the cutting edges in accordance with the present invention.

DETAILED DESCRIPTION OF THE PREFERRED EMBODIMENTS

Figure 1:
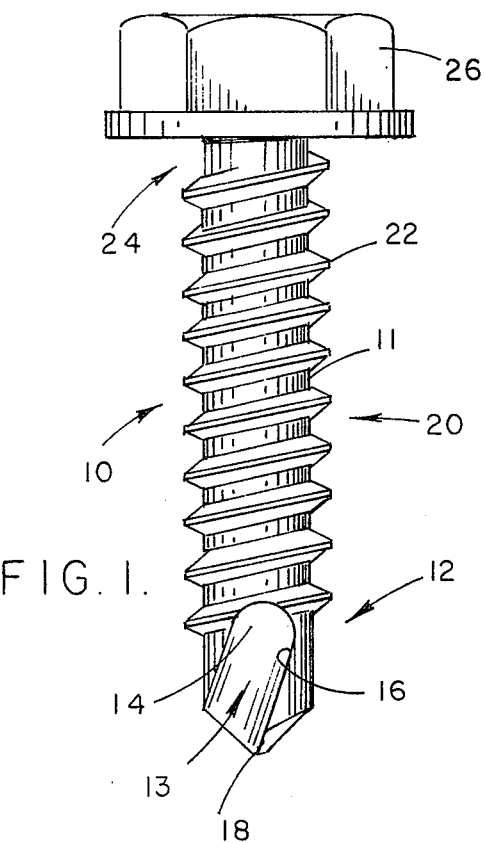
FIG. 1 is a side elevational view of the drilling and tapping screw in accordance with the present invention, showing one of the flutes.

Referring now specifically to the drawings, in which the same reference numerals have been utilized to designate similar or identical parts throughout, and first referring to FIG. 1, a drilling and tapping screw in accordance with the present invention is illustrated in FIG. 1 and is generally designated by the reference numeral 10. The screw 10 is provided with a generally cylindrical shank 11, best shown in FIG. 2.

The screw 10 has a pilot or leading portion or end 12 which is utilized to drill and tap a bore in the material in which the screw 10 is to be inserted. The pilot or leading end 12 is provided with helical flutes 13 disposed about the periphery of the shank 11 and uniformly spaced from each other about the axis generally defined by the shank.

Each flute 13 is generally defined by a relief surface 14 and a cutting surface 16 which, in the presently preferred embodiment, are disposed relative to one another approximately 90°. However, the specific angle between the relief and cutting surfaces forming each individual flute is not critical for the purposes of the present invention and any conventional or convenient angle or transition between the two surfaces may equally be utilized. Disposed at the leading edge of each cutting surface 16, or lower edge as viewed in FIG. 1, is a cutting edge portion 18 which forms an important feature of the present invention and which will be described in more detail in connection with FIGS. 12–14 and 16.

The screw 10 has an intermediate portion 20 which is provided with a helical thread. The thread 22 is so arranged that the screw is threaded for rotation in a predetermined direction and for advancement into a material. Viewing the screw of FIG. 1, from the top thereof in its axial direction, the screw 10 is threaded for advancement with rotation in a clockwise direction. However, a thread of a different or opposite sense for advancement with counter-clockwise rotation is equally possible.

The opposing or top end 24 is termed a trailing end and is provided with a manipulating hexagonal head 26 of conventional configuration. Any other manipulating head may, clearly, be equally utilized.

Before examining with great particularity the structural features and dimensions of the screw in accordance with the present invention, the method by which such a screw is obtained will be briefly described. The method, which is the subject of co-pending patent application Ser. No. 201,223, is important since the method produces drilling and tapping screws of the type under discussion. In this connection, the disclosure in application Ser. No. 201,223 is hereby incorporated by reference to thereby include in the present application the specific details of the method there described.

Generally, the screw 10 is manufactured from a blank 28 which may be of a conventional type. Preferably, the blank 28 is made from a ductile material which has low carbon content. One example of such a metal is AISI 1022 fine grain aluminum killed steel. The screw can be carburized about the exterior surface thereof to provide the requisite hardness for cutting. However, the carburization does not effect to any substantial degree the interior of the screw which remains ductile. Consequently, the exterior of the screw becomes sufficiently hardened for drilling and tapping purposes while the interior remains sufficiently ductile and flexible to prevent breakage of the screws.

Referring to FIGS. 3–6, the pilot or leading end 12 of the blank 28 is positioned between two dies 32 and 34, which may be of conventional design. Die 34 is provided with a ridge 36 which is disposed opposite a relatively flat die surface 38 of the die 32. The dies 32 and 34 are adapted to move towards and away from each other along a horizontal direction, as viewed in the FIGURES.

At successive stages of forging, the pilot or end portion 12 is pinched by the dies 32, 34 to form the screw pilot portion or end 12a and a flash or bur 12b.

Figure 6:
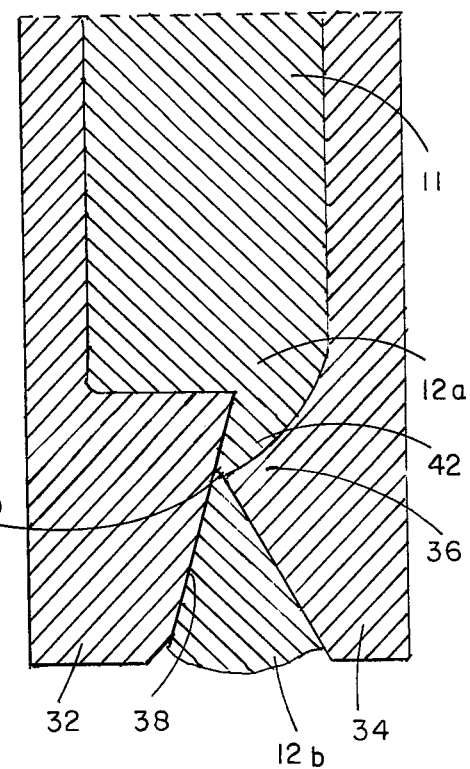

As best illustrated in FIG. 6, the pilot portion 12a and the flash 12b remain connected to each other by an increasingly narrow connecting portion 40. The configurations of the dies 32, 34 form, simultaneously, with the formation of the connecting portion 40, portion 42 of the screw, which to be more fully described hereafter, incorporates the cutting surface 16.

Figure 7:
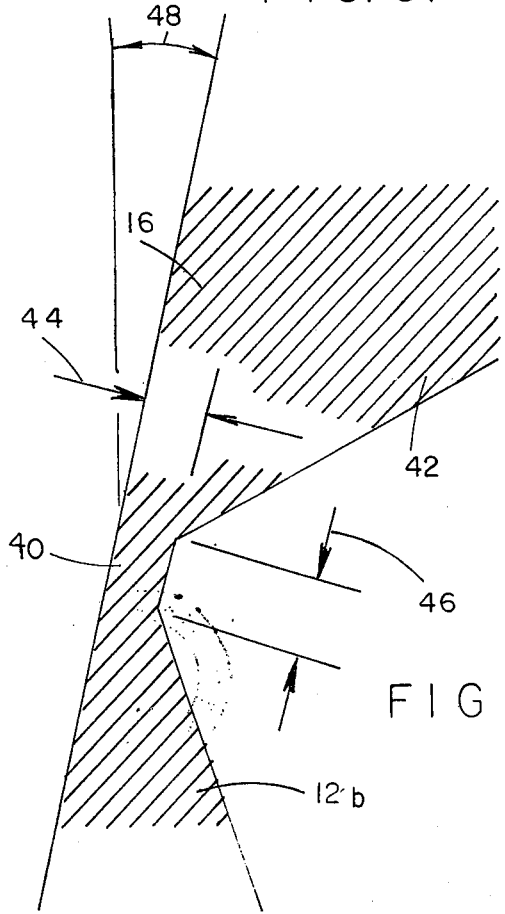
FIG. 7 is an enlarged fragmented view of the blank as it is shaped in FIG. 6 and just prior to removal of the nose by a twisting operation.

The details of the connecting portion 40 are illustrated in FIG. 7. Important dimensions in the formation of the screw 10 in accordance with the present invention, include the dimension 44 which represents the width of the connecting portion 40. This dimension must be made as small as possible without causing premature breakage or separation between portions 12a and 12b solely by the action of the dies 32, 34. It has been found that dimensions which are not greater than 0.004 inches are satisfactory.

Another important dimension is the length 46 of the connecting portion 40 which determines the size or length of the cutting edge portion 18 when the latter is formed subsequent to a twisting separation between the flash 12b and the portion 42. A length 46 which has been found to be satisfactory is 0.005 inches. This dimension is generally substantially smaller than the overall dimensions of the pilot portion 12. As will be described hereafter, the provision of a small but relatively sharp cutting edge portion provides the advantageous characteristics of the present invention.

The dies 32, 34 are configurated to form the cutting surface 16 at an angle 48, relative to a plane through the axis of the screw, which intersects the outer extremities of the cutting edge, measured perpendicular to the cutting edge which is advantageously approximately 13°. However, the angle 48 is not a critical angle.

Figure 8:
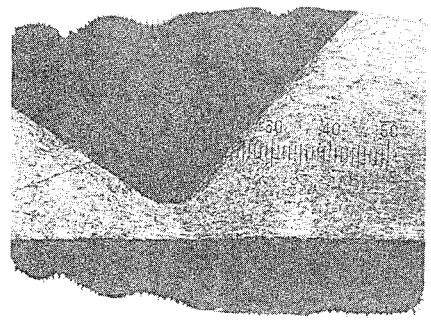
FIGS. 8 and 9 are photographs showing portions of the screw subsequent to the forging operation, showing the grain lines formed during the forging operation which makes it possible to obtain the cutting edge portions in accordance with the present invention.
Figure 9:
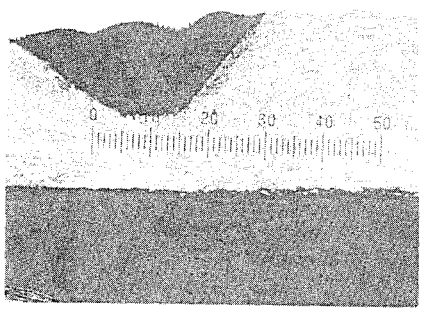

In FIGS. 8 and 9, the grains of the metal of the screw are illustrated. It should be noted that the pinching operation compresses the metal and causes the same to flow along lines longitudinally of the screw. In FIGS. 8 and 9, the portion 42 is indicated at the right of each photograph while the flashes or burs are indicated at the left. It should be noted in these photographs that the grain lines are typically not parallel to the cutting surface 16, which are represented by the lowermost edge in the photographs or FIGS. 8 and 9. Instead, the grain lines are essentially curvilinear and curve from the connecting portions 40 away from the cutting surfaces 16. It is this grain structure which facilitates the twisting of the pilot or end portion 12b relative to the portion 42 to thereby sever the former from the latter and simultaneously form the cutting edge portion 18 oriented at the proper rake angle into its respective flute 13.

Figure 2:
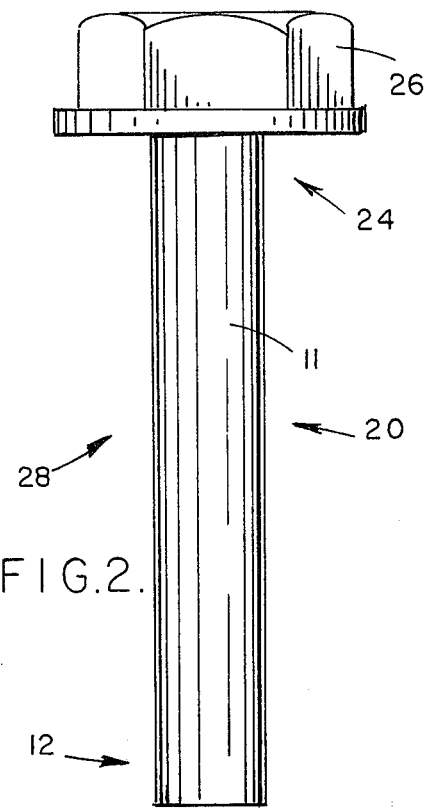
FIG. 2 is a side elevational view of a blank utilized in manufacturing the screw shown in FIG. 1.
Figure 3:
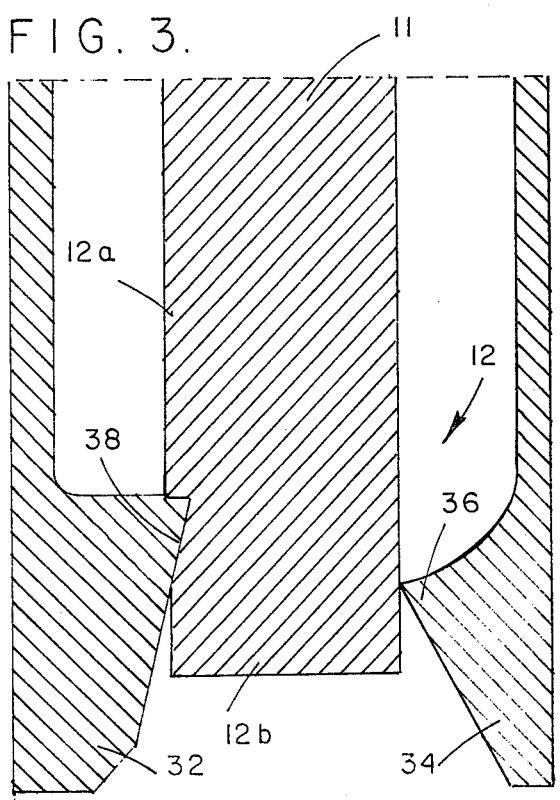
FIGS. 3–6 schematically show two opposing dies acting upon a blank such as shown in FIG. 2, showing the successive stages of cold forming on the blank in the manufacture of the screw shown in FIG. 1 incorporating the present invention, the sections being in a plane perpendicular to the cutting edge.
Figure 4:
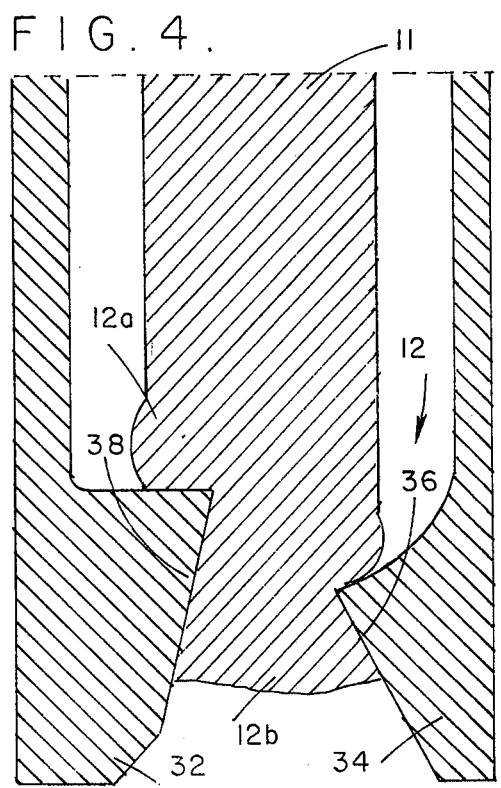
Figure 5:
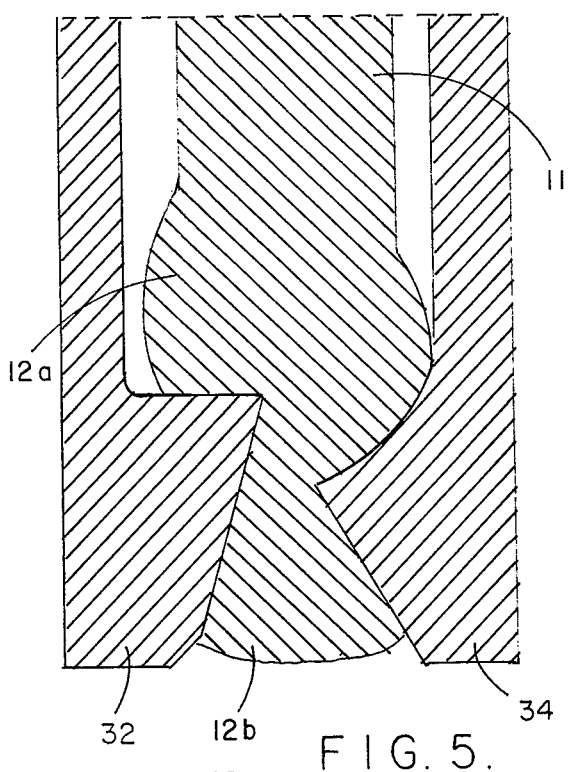

In FIG. 10, the blank 28 shown in FIG. 2 is illustrated subsequent to the forging operation wherein the blank is alternately provided with ears 50 and land surfaces 52 about the periphery of the pilot or end portion 12. The blank is also provided with face or end surfaces 54 which define the leading surfaces of the completed screw.

The flash or bur 12b described hitherto forms part of a nose 56 which is twisted off from the main part of the screw at fracture or folding lines 58 as more fully described in co-pending application Ser. No. 201,223. The fracture or folding lines 58 represent the connecting portions 40.

When the nose 56 and the ears 50 have been removed, the resulting unthreaded article is shown in FIG. 11. It is pointed out that with prior art drilling and tapping screws, the cutting surfaces 16 are normally made as sharp as possible so that when the drilling or pilot end portion thereof is urged against the solid material to be drilled to form a recess or bore therein, the force necessary for drilling the opening will be a minimum. The emphasis in providing an effective cutting surface is the provision of a sharp endmost leading cut edge 18, which, in the past, however, has defined a relatively low rake angle with respect to the axis of the shank.

In order to enhance the cutting capability of the cutting surfaces 16, the screw in accordance with the present invention is provided with relatively smooth, small dimensioned cutting edge portions which continuously project into respective flutes. Several of the dimensions and angular orientations defined by the cutting edge portions 18 of the present invention are critical and will be more fully described hereafter.

In FIG. 12, the screw is shown before the nose 56 has been moved while FIGS. 13 and 14 illustrate the screw subsequent to severance thereof. However, the cutting edge portions 18 and the specific construction thereof are not fully evident in these FIGURES due to the relatively small dimensions of the cutting edge portions, as suggested above.

FIG. 16 illustrates some of the important dimensions and angular orientations of the screw in accordance with the present invention, and particularly the cutting edge portion 18 thereof. Firstly, it will be noted that the cutting edge portion 18 generally has small dimensions compared to the dimensions of the screw 10. An important feature of the present invention is that the rake angle perpendicular to the cutting edge relative to a plane through the axis of the shank 11 which intersects the outer extremities of the cutting edge at least equals approximately 45°. Stated otherwise, the angle 60 is no greater than 45°. On the other hand, the rake angle between each cutting surface 16 and the above mentioned plane is equal to approximately 13°. However, as noted above, this latter angle is not critical and may be varied, with different degrees of advantage.

The linear dimensions of the cutting edge portion 18 are small. For example, the maximum height 64 of each cutting edge portion 18 along the direction of the axis of the shank 11 is approximately 0.0025 inches. Also, each cutting edge portion 18 projects forwardly, into an associated flute, in a direction normal to an associated cutting surface 16, a distance 62 approximately in the range between 0.001 to 0.003 inches. The presently preferred range is between 0.0015 to 0.002 inches.

The relief angle of each cutting portion 18 relative to a plane normal to the axis of the shank 11 is approximately equal to the angle formed between a plane passing through the axis and intersecting the outer extremities of the cutting edges and the cutting surface 16. Thus, the angle 68 is selected to be approximately 13°, with the same lack of criticality attached thereto. Also, the relief angle 70 of each face or end surface 54 relative to a direction normal to the above mentioned plane passing through the axis of the shank 11 is selected to be approximately 28°. The two relief angles are not critical and may be varied, with different degrees of advantage.

Accordingly, the portion 42 defines an angle 72 between the cutting surface 16 and the face or end surface 54 which is approximately equal to 40°.

Each flute 13 is generally helical in configuration about the axis of the shank 11. The cutting surface 16 and the relief surface 14 defining each flute 13 are generally disposed approximately 90° with respect to one another. As can best be observed in FIGS. 11 and 15, the cutting edge portions 18 extend into their respective flutes along the entire transverse distance of the lower cutting edges of the cutting surfaces 16. When the shank is threaded for rotation in a predetermined direction, each cutting surface 16 is provided with a leading cutting edge portion 18 of generally lateral extent relative to the longitudinal axis of the shank, each cutting edge portion 18 projecting into its respective flute from the lowermost edge of an associated cutting surface.

A major advantage of the subject screw over those of the prior art is the present utilization of a small but sharp cutting edge which first contacts the material. On the other hand, the prior art drilling and tapping screws have utilized cutting edges which have typically had substantially larger dimensions but which have been substantially less sharp. Consequently, the drilling and tapping screws of the prior art have operated more on the principle of strength whereas the present screw operates more on the principle of providing the sharpest possible edges for cutting the material. To this end, the cutting edges 18 are smooth and include a relatively large rake angle relative to a plane through the axis of the shank and intersecting the outer extremities of the cutting edges advantageously greater than approximately 45°. The screws of the prior art have generally utilized smaller rake angles but, as noted above, have utilized cutting edges which have typically had greater dimensions.

The drilling and tapping screws made in accordance with the present invention have been subjected to standard tests. To provide a comparison of performance of the present screws with prior art screws, both types of screws were made from the same production batches and were processed identically except for the method of tip removal. The prior art screws were manufactured by breaking off the tip, as frequently effected in the prior art. On the other hand, the screws of the present invention were provided with cutting edge portions similar to those shown in FIG. 16 by the twisting method described in the above referenced application Ser. No. 201,223.

Twelve samples of each screw were tested for drilling time. The fastest and slowest drill times were noted and the balance of ten screws were averaged. The test parameters were as follows:

Screw size - 8-18 × ½ hex washer head
Drill speed - 2500 R.P.M.
Drilling weight - 40 No.
Material - 0.089 inches thickness C.R. steel strip.
Drill times are noted in minutes:

|  | DRILLING TIME (MIN.) PRIOR ART SCREWS | PRESENT SCREWS |  |
| --- | --- | --- | --- |
|  | .075 | .061 |  |
|  | .134 | .037 |  |
|  | .073 | .048 |  |
|  | .089 | .054 |  |
|  | .124 | .079 |  |
|  | .084 | .054 |  |
|  | .071 | .075 |  |
|  | .106 | .056 |  |
|  | .084 | .039 |  |
|  | .079 | .071 |  |
|  | .071 | .042 |  |
|  | .084 | .057 |  |
| Slowest | .134 | .079 |  |
| Fastest | .071 | .037 |  |
| Avg. | .087 | .056 | % Diff. 35.6% |

A number 8-18 drill screw in accordance with the present invention was further tested as to the drilling speed in accordance with the following test parameters:

Material - 0.089 inches thickness C.R. steel strip.
R.P.M. - 1800
Average Drill Time (Min) - 0.050
Drill Pressure 40 pounds Under the above conditions, approximately 90 revolutions are required for the drill to penetrate the steel plate. This represents a typical drill travel of 0.118 inches, this being the sum of the thickness of the steel plate and the height of the tapered end of the drill screw. Accordingly, with a drill travel of 0.118 inches in 90 revolutions, this represents a typical or average advancing rate or drilling rate of 0.0013 inches per revolution. The drilling times above described represent a substantial improvement over those achievable with prior art, rough edged screws.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A drilling screw comprising an elongate shank including a trailing end portion at one end of said shank and a leading end portion at an opposite end of said shank, an intermediate portion of said shank being threaded for rotation in a predetermined direction and for advancement into a material, said trailing end portion being provided with a manipulating head, said leading end portion including cutting surfaces and relief surfaces each associated with another cutting surface, each cutting surface being angularly advanced about the axis of said shaft with respect to an associated relief surface relative to said predetermined direction of rotation to define a flute, each cutting surface including a substantially smooth leading cutting edge portion of generally lateral extent relative to the longitudinal axis of said shank, each cutting edge portion projecting into a respective flute from the lowermost edge of an associated cutting surface, each cutting portion having dimensions substantially smaller than those defining said flutes and having a maximum height along the direction of said shank of approximately 0.0025 inches, each cutting edge portion projecting into a respective flute from the lowermost edge of an associated cutting surface along a direction normal to the latter a distance in the range of 0.001 to 0.003 inches, and each cutting edge portion defining a rake angle relative to the axis of said shank of at least approximately 45°.

2. A drilling screw as defined in claim 1, wherein the rake angle between each cutting surface and a plane through said axis of said shank which intersects the outer extremities of the cutting edge is equal to approximately 13°, measured perpendicular to the cutting edge.

3. A drilling screw as defined in claim 1, wherein the range is between 0.0015 to 0.002 inches.

4. A drilling screw as defined in claim 1, wherein the relief angle of each cutting portion relative to a plane normal to said axis of said shank is approximately 13°.

5. A drilling screw as defined in claim 1, wherein said shank is made from a ductile steel.

6. A drilling screw as defined in claim 5, wherein said steel has a low carbon content.

7. A drilling screw as defined in claim 6, wherein the exterior surface of the screw is carburized while the interior of the screw is ductile.

8. A drilling screw as defined in claim 1, wherein the cutting surface and the relief surface defining each flute are generally displaced approximately 90° with respect to one another.

9. A drilling screw as defined in claim 1, wherein each flute is of generally helical configuration about said axis of said shank.

10. A drilling screw as defined in claim 1, wherein two flutes are provided disposed diametrically on opposite sides of said axis of said shank.

* * * * *